(12) United States Patent
Nakajima

(10) Patent No.: US 11,097,574 B2
(45) Date of Patent: Aug. 24, 2021

(54) TYRE

(71) Applicant: SUMITOMO RUBBER INDUSTRIES, LTD., Hyogo (JP)

(72) Inventor: Koichi Nakajima, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 253 days.

(21) Appl. No.: 16/275,451

(22) Filed: Feb. 14, 2019

(65) Prior Publication Data

US 2019/0263194 A1   Aug. 29, 2019

(30) Foreign Application Priority Data

Feb. 28, 2018 (JP) ............................. JP2018-034040

(51) Int. Cl.
*B60C 13/00* (2006.01)

(52) U.S. Cl.
CPC .................... *B60C 13/001* (2013.01)

(58) Field of Classification Search
CPC ............................. B60C 13/001; B60C 13/02
See application file for complete search history.

(56) References Cited

U.S. PATENT DOCUMENTS

| | | | | |
|---|---|---|---|---|
| 5,728,242 A | * | 3/1998 | Barrese | B60C 13/001 152/523 |
| 2008/0283169 A1 | * | 11/2008 | Sato | B60C 13/001 152/450 |
| 2012/0227879 A1 | * | 9/2012 | Muhlhoff | B23K 26/36 152/151 |
| 2018/0099530 A1 | * | 4/2018 | Yonetsu | B29D 30/72 |
| 2019/0193482 A1 | * | 6/2019 | Yonetsu | B60C 13/02 |
| 2019/0202244 A1 | * | 7/2019 | Okamatsu | C08K 3/04 |

FOREIGN PATENT DOCUMENTS

| | | | |
|---|---|---|---|
| JP | 9-86106 A | | 3/1997 |
| JP | 2012131283 A | * | 7/2012 |

\* cited by examiner

*Primary Examiner* — Jacob T Minskey
*Assistant Examiner* — Virak Nguon
(74) *Attorney, Agent, or Firm* — Greenblum & Bernstein, P.L.C.

(57) ABSTRACT

One or more marks provided on a reference surface has an edging portion forming an outer edge of the or each mark and a mark main portion arranged inside the edging portion. A surface of the edging portion is inclined with respect to the reference surface in a direction in which a height thereof from the reference surface increases from one side to the other side in a tyre radial direction. A surface of the mark main portion is inclined with respect to the reference surface in an opposite direction to the surface of the edging portion.

19 Claims, 6 Drawing Sheets

TYRE

TECHNICAL FIELD

The present invention relates to a tyre having improved legibility of a mark provided on a sidewall portion.

BACKGROUND ART

On a surface of at least one of the sidewall portions of the tyre, one or marks which are letters, symbols, and the like indicating the manufacturer name, brand name, size, and the like of the tyre are formed. And in order to improve the legibility of the marks, for example, the marks are formed to be one step higher than the surface of the sidewall portion, and ridges are provided on the surfaces of the marks (for example, see Japanese Unexamined Patent Application Publication No. H9-086106).

SUMMARY OF THE INVENTION

However, conventional marks have a constant height, therefore, even when a ridge is formed on the surface thereof, they have monotonous appearance and little change in contrast. Thereby, the legibility cannot be sufficiently improved.

An object of the present invention is to provide a tyre capable of improving design by providing a change in appearance of the marks and capable of improving the legibility of the marks.

In one aspect of the present invention, a tyre comprises a sidewall portion provided with a mark indicating portion having one or more marks, wherein the mark indicating portion comprises a reference surface provided on a surface of the sidewall portion and the one or more marks formed on the reference surface, and the or each mark is provided with an edging portion forming an outer edge of the or each mark and a mark main portion arranged inside the edging portion, a surface of the edging portion is inclined with respect to the reference surface in a direction in which a height thereof from the reference surface increases from one side to the other side in a tyre radial direction, and a surface of the mark main portion is inclined with respect to the reference surface in an opposite direction to the surface of the edging portion.

In another aspect of the invention, it is preferred that the or each mark has, in a middle region of a width thereof in the tyre radial direction, an equal height portion in which a height of the surface of the edging portion from the reference surface and a height of the surface of the mark main portion from the reference surface are equal to each other.

In another aspect of the invention, it is preferred that a difference $\Delta\theta$ between an inclination angle $\theta1$ of the surface of the edging portion with respect to the reference surface and an inclination angle $\theta2$ of the surface of the mark main portion with respect to the reference surface is not more than 5 degrees.

In another aspect of the invention, it is preferred that in the or each mark, one of the surface of the edging portion and the surface of the mark main portion is provided with a plurality of small protruding portions.

In another aspect of the invention, it is preferred that each of the small protruding portions is a truncated conical protrusion having a smaller diameter on a side of an upper end thereof.

In another aspect of the invention, it is preferred that each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

In another aspect of the invention, it is preferred that each of the small protruding portions is a rib-shaped protrusion having a trapezoidal cross section with a thickness thereof decreasing toward an upper end thereof, and the rib-shaped protrusions are arranged parallel to each other or in a non-parallel manner.

In another aspect of the invention, it is preferred that each of the rib-shaped protrusions has a maximum thickness in a range of from 20 to 1000 micro meters and a protruding height in a range of from 200 to 500 micro meters, and a distance between the rib-shaped protrusions adjacent to each other is in a range of from 10 to 800 micro meters.

In one aspect of the present invention, in the or each mark, the surface of the edging portion and the surface of the mark main portion are inclined in directions opposite to each other in the tyre radial direction.

Thereby, a change is given to the appearance of the or each mark, thereby, it is possible that the design is improved.

Further, height relationship between the edging portion and the mark main portion interchanges between an inner side and an outer side in the tyre radial direction, therefore, a large change is caused in shadow, therefore, it is possible that the stereoscopic effect is increased. Furthermore, it is possible that a manner of light reflection is made different between the reference surface, the surface of the edging portion, and the surface of the mark main portion, therefore, it is possible that contrast is increased. And by a synergistic effect of these, it is possible that the legibility of the one or more marks is improved.

DESCRIPTION OF THE PREFERRED EMBODIMENT

An embodiment of the present invention will now be described below in detail.

Figure 1:
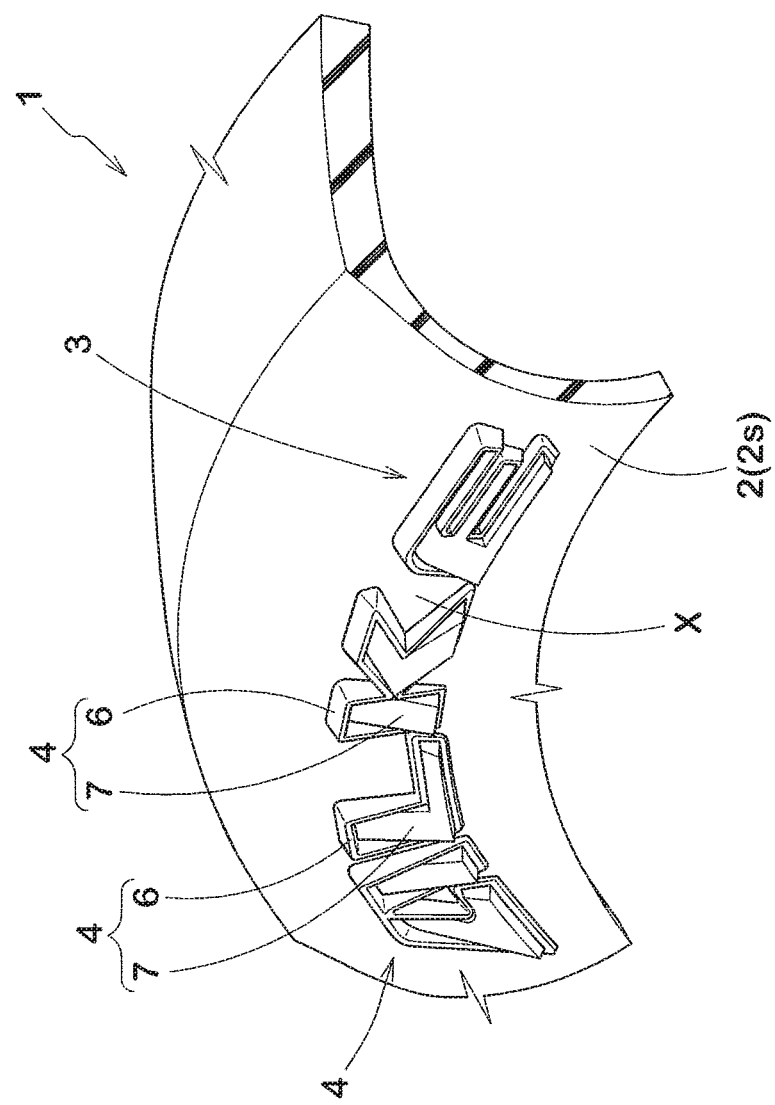
FIG. 1 is a partial perspective view of a tyre according to an embodiment of the present invention.

As shown in FIG. 1, a tyre 1 in this embodiment is provided with one or more mark indicating portions 3 in at least one of sidewall portions 2.

Each of the mark indicating portions 3 is provided with a reference surface (x) provided on a surface (2s) of a respective one of the sidewall portions 2 and one or more marks 4 formed on the reference surface (x). In this embodiment, a case is shown where the reference surface (x) is a part of the surface (2s) of a respective one of the sidewall portions 2.

The marks 4 are letters, symbols, and the like indicating the manufacturer name, brand name, size, and the like of the tyre, and in this embodiment, a brand name consisting of a plurality of the marks 4 is formed on the reference surface (x).

Figure 2:
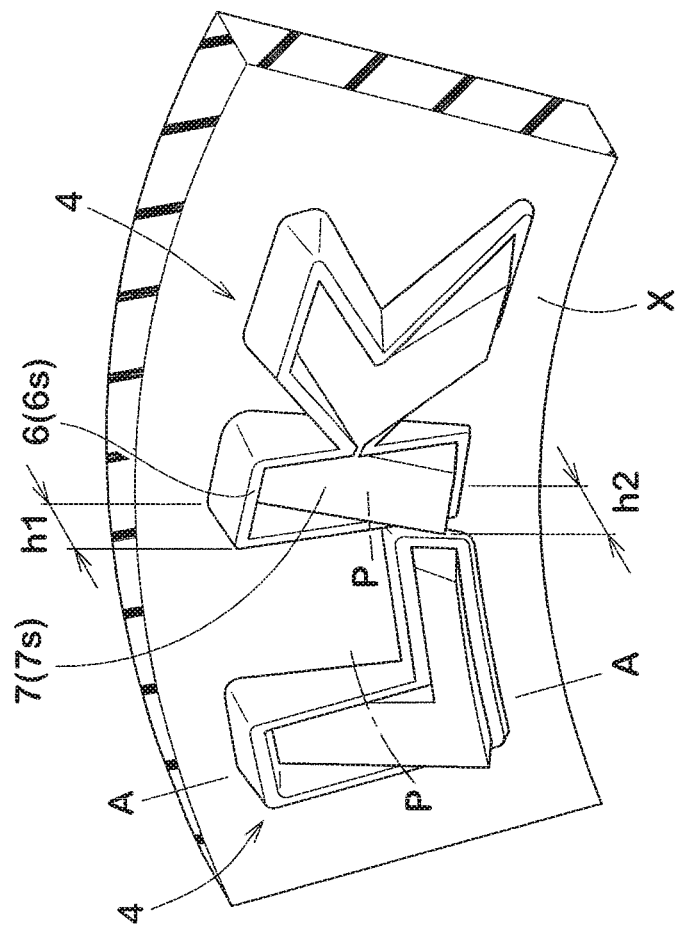
FIG. 2 is an enlarged partial perspective view of marks.

As shown in FIGS. 1 and 2, each of the marks 4 includes an edging portion 6 forming an outer edge of a respective one of the marks 4 and a mark main portion 7 arranged inside the edging portion 6.

Figure 3:
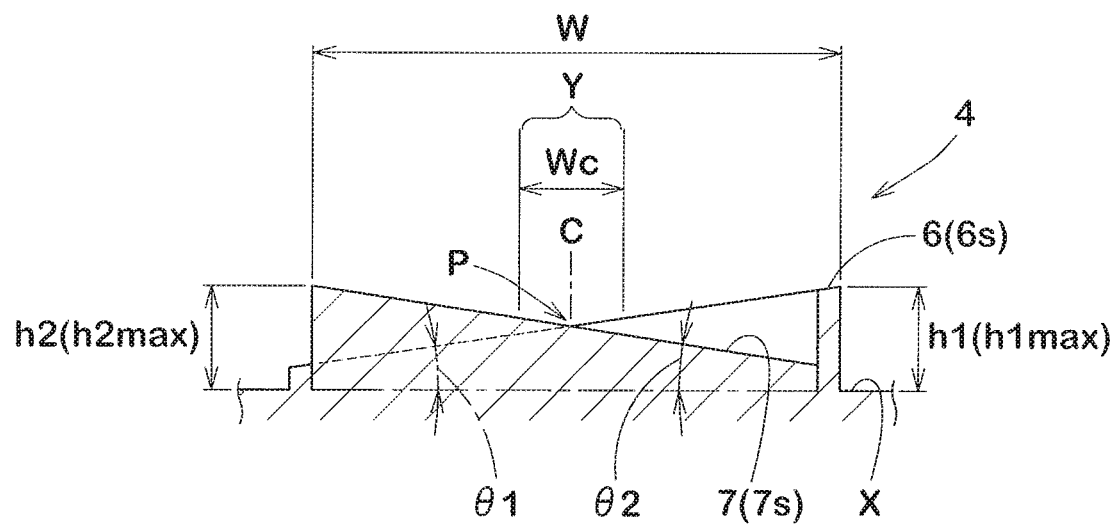
FIG. 3 is an enlarged cross-sectional view of one of the marks taken along A-A line of FIG. 2.

And as shown in FIGS. 2 and 3, a surface (6s) of the edging portion 6 is inclined with respect to the reference surface (x) in a direction in which a height (h1) thereof from the reference surface (x) increases from one side in a tyre radial direction (an inner side in the tyre radial direction in this embodiment) to the other side in the tyre radial direction (an outer side in the tyre radial direction in this embodiment). On the other hand, a surface (7s) of the mark main portion 7 is inclined with respect to the reference surface (x) in an opposite direction to the surface (6s) of the edging portion 6, that is inclined in a direction in which a height (h2) thereof from the reference surface (x) decreases from one side in the tyre radial direction (the inner side in the tyre radial direction in this embodiment) to the other side in the tyre radial direction (the outer side in the tyre radial direction in this embodiment).

As shown in FIG. 3, it is preferred that a difference $\Delta\theta$ (=|$\theta 1-\theta 2$|) between an inclination angle $\theta 1$ of the surface (6s) of the edging portion 6 with respect to the reference surface (x) and an inclination angle $\theta 2$ of the surface (7s) of the mark main portion 7 with respect to the reference surface (x) is not more than 5 degrees.

Further, it is preferred that each of the marks 4 has, in a middle region (Y) of a width (w) thereof in the tyre radial direction, an equal height portion (P) in which the height (h1) of the surface (6s) of the edging portion 6 and the height (h2) of the surface (7s) of the mark main portion 7 are equal to each other.

Figure 7:
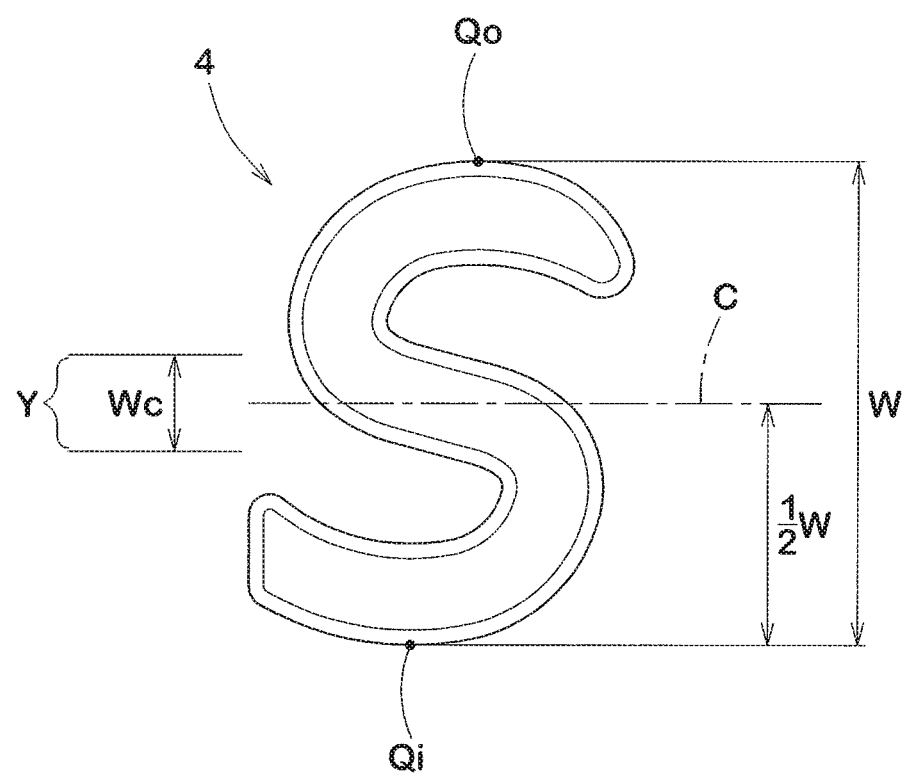
FIG. 7 is a plan view of one of the marks for illustrating a middle region.

The "middle region (Y)" is a region having a width (Wc) with a center thereof on a position (c) which is ½ of the width (w) in the tyre radial direction of a respective one of the marks 4, and the width (Wc) is 20% of the width (w) in the tyre radial direction. Note that as illustrated in FIG. 7, the width (w) in the tyre radial direction is defined as a distance in the tyre radial direction between an inner most point (Qi) and an outermost point (Qo) in the tyre radial direction, that is a maximum width in the tyre radial direction, of a respective one of the marks 4.

Note that, in each of the marks 4, it is also preferred that a difference $\Delta h$ (=|h1max−h2max|) between a maximum value (h1max) of the height (h1) of the edging portion 6 and a maximum value (h2max) of the height (h2) of the mark main portion 7 is not more than 2 mm.

In each of the marks 4 configured as such, height relationship between the edging portion 6 and the mark main portion 7 interchanges between the inner side and the outer side in the tyre radial direction, therefore, a change is given to appearance of the marks 4, thereby, it is possible that the design is improved. Further, a large change is caused in the shadow, therefore, it is possible that the stereoscopic effect is increased. Furthermore, it is possible that the manner of light reflection is made different between the reference surface (x), the surface (6s) of the edging portion 6, and the surface (7s) of the mark main portion 7, therefore, it is possible that contrast (difference in brightness) is increased. And by the synergistic effect of these, it is possible that the legibility of the marks is improved.

Further, by providing the equal height portion (P) in the middle region (Y) and by setting the difference $\Delta\theta$ of the inclination angles $\theta 1$ and $\theta 2$ to be not more than 5 degrees, it becomes possible that the effects described above are exerted at a maximum level. Furthermore, it is possible that the balance between the edging portion 6 and the mark main portion 7 is optimized, therefore, it is possible that the design is further improved.

Figure 5A:
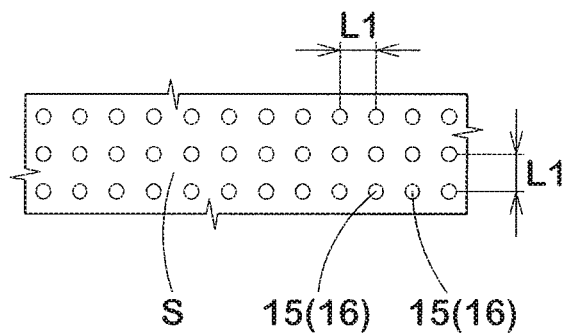
FIG. 5A is a partial plan view showing an arrangement of small protruding portions formed as truncated conical protrusions.
Figure 5B:
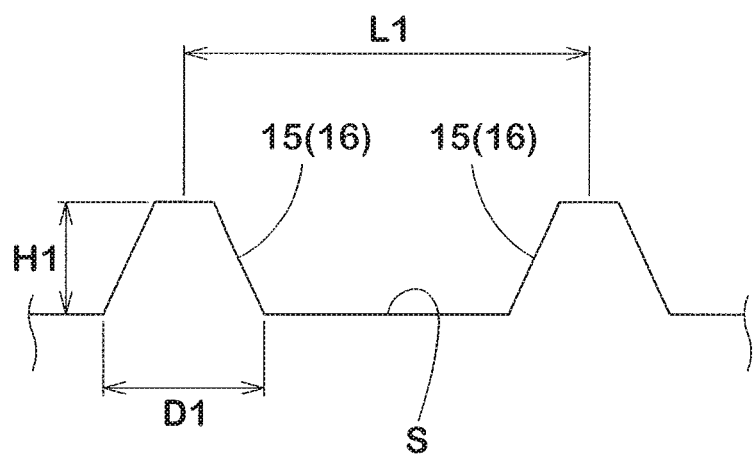
FIG. 5B is a cross-sectional view of the truncated conical protrusions.

Further, in each of the mark indicating portions 3, as shown in FIGS. 5A and 5B, it is preferred that a surface (s), which is one of the surfaces (6s) of the edging portion 6 and the surface (7s) of the mark main portion 7, is provided with a plurality of small protruding portions 15 each protruding from the surface (s). In this embodiment, a case where each of the small protruding portions 15 is a truncated conical protrusion 16 having a smaller diameter on a side of an upper end thereof is shown. It is preferred that each of the truncated conical protrusions 16 has a maximum diameter (D1) in the range of from 50 to 1000 micro meters and a protruding height (H1) from the surface (s) in the range of from 50 to 1000 micro meters, and that a distance (L1) between centers of the small protruding portions 15 adjacent to each other is in the range of from 200 to 1000 micro meters.

It is possible that the truncated conical protrusions 16 configured as such irregularly reflect light and make the surface (s) (the surface (6s) or the surface (7s)) look black. Thereby, it is possible that the legibility of the marks 4 is further improved. As a result of research by the present inventor, when the maximum diameter (D1) and the protruding height (H1) of each of the truncated conical protrusions 16, and the distance (L1) of the truncated conical protrusions 16 are outside the above ranges, the surface (s) looks whitish due to the reflection of light, therefore, the contrast difference between the surfaces (6s) and (7s) tends to be decreased. Note that by configuring each of the small protruding portions 15 to have a truncated cone shape, it is possible that the reflection of light is further suppressed while the strength is increased as compared with a cylindrical shape.

In this embodiment, a case is shown in which the truncated conical protrusions 16 are arranged in a grid patter but they may be arranged in a staggered pattern, or may be randomly arranged as long as the distance (L1) satisfies the above range.

Figure 6A:
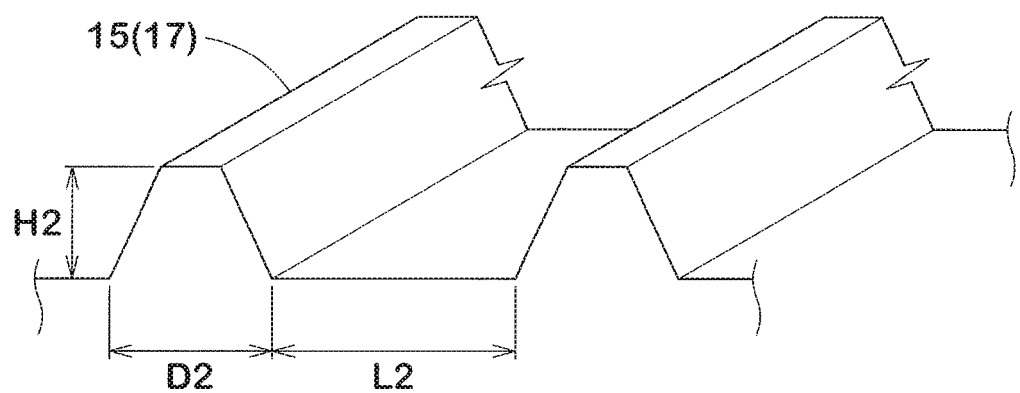
FIG. 6A is a partial perspective view showing an arrangement and cross sections of the small protruding portions formed as rib-shaped protrusions.
Figure 6B:
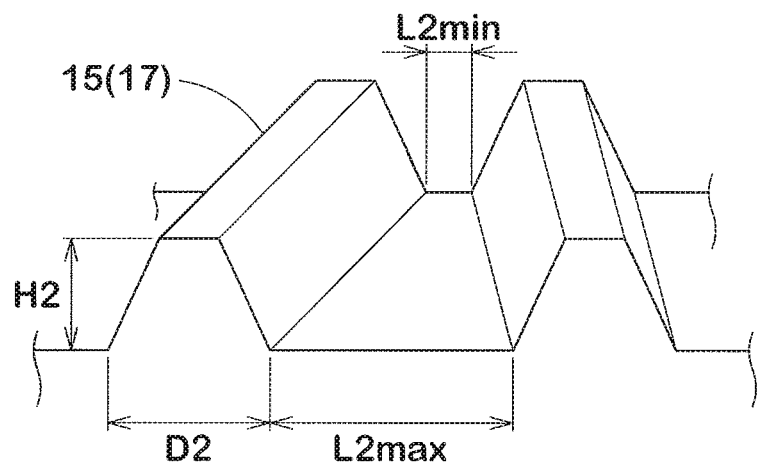
FIG. 6B is a partial perspective view showing another arrangement and the cross sections of the small protruding portions formed as the rib-shaped protrusions.

FIGS. 6A and 6B show another embodiment of the small protruding portions 15. In this embodiment, a case is shown where each of the small protruding portions 15 is a rib-shaped protrusion 17 having a trapezoidal cross section with a thickness thereof decreasing toward an upper end thereof. The rib-shaped protrusions 17 can be arranged parallel to each other as shown in FIG. 6A, or they can be arranged so as not to be parallel to each other (non-parallel) as shown in FIG. 6B. It is preferred that each of the rib-shaped protrusions 17 has a maximum thickness (D2) in the range of from 20 to 1000 micro meters and a protruding height (H2) in the range of from 200 to 500 micro meters, and that a distance (L2) between the rib-shaped protrusions 17 adjacent to each other is in the range of from 10 to 800 micro meters. Note that in a case where the rib-shaped protrusions 17 are arranged in the non-parallel manner, it is preferred that an average value of a maximum value (L2max) and a minimum value (L2min) of the distance (L2) is in the range of from 10 to 800 micro meters.

As is the case with the truncated conical protrusions 16, it is possible that the rib-shaped protrusion 17 irregularly reflect light and make the surface (s) (the surface (6s) or the surface (7s)) look black. Thereby, it is possible that the legibility of the marks 4 is further improved. As a result of research by the present inventor, when the maximum thickness (D2) and the protruding height (H2) of each of the rib-shaped protrusions 17, and the distance (L2) of the rib-shaped protrusions 17 are outside the above ranges, the surface (s) looks whitish due to the reflection of light, therefore, the contrast difference between the surfaces (6s) and (7s) tends to be decreased. Note that, from a point of view of the contrast, it is more preferred that the rib-shaped protrusions 17 are arranged in the non-parallel manner.

It is possible that each of the mark indicating portions 3 is provided with a base portion which projects stepwise at a constant height (H5) from the surface (2s) of a respective one of the sidewall portions 2 (that is, a top surface of the base portion is not inclined with respect to the surface (2s)). In this case, a surface of the base portion forms the reference surface (x).

Figure 4:
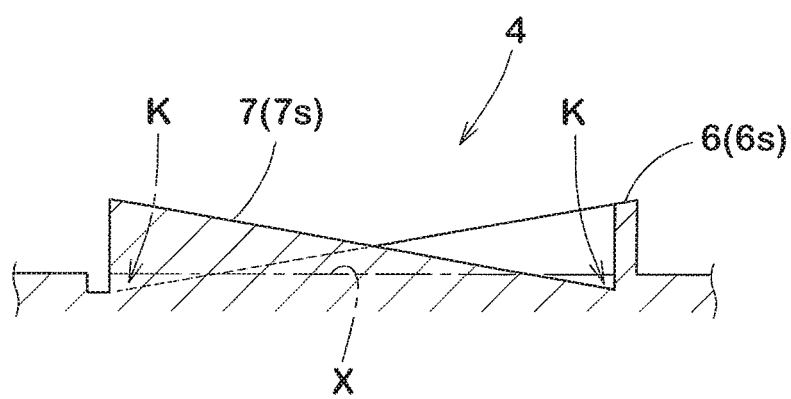
FIG. 4 is a cross-sectional view of one of the marks of another embodiment.

Further, in this embodiment, as shown in FIG. 3, a case where the edging portion 6 and the mark main portion 7 are protruded from the reference surface (x). However, as shown in FIG. 4, it is possible that the edging portion 6 and/or the mark main portion 7 also includes a portion (K) in which the height (h1) and/or the height (h2) is minus, that is the surface thereof is lower than the reference surface (x). Furthermore, it is preferred that each of the surface (6s) and (7s) is a flat surface, however, they may be curved surfaces extending in a curved manner in an arc shape.

While detailed description has been made of the tyre as especially preferred embodiments of the present invention, the present invention can be embodied in various forms without being limited to the illustrated embodiments.

Working Examples (Examples)

Tyres provided with the mark indicating portions on the surfaces of the sidewall portions were made by way of test according to the specifications listed in Table 1, and then the legibility of the marks was compared. The height of the base portion was the same for all of the test tyres, and the maximum height of each of the marks from the reference surface (x) was the same for all of the test tyres.

In Reference 1, each of the marks had a constant height from the base portion and the surface is not inclined. In Examples 5 to 7, the small protruding portions were formed on the surfaces of the edging portions. In the Example 5, the small protruding portions were the truncated conical protrusions each having the maximum diameter (D1) of 320 micro meters and the protruding height (H1) of 500 micro meters, and the distance (L1) was 420 micro meters. In the Examples 5 and 6, the small protruding portions were the rib-shaped protrusions each having the maximum thickness (D2) of 160 micro meters and the protruding height (H2) of 200 micro meters, and the distance (L2) was 200 micro meters.

The legibility was evaluated by a visual observation and the evaluation is indicated by an index based on the Reference 1 being 100, wherein a larger numerical value is better.

TABLE 1

|  | Ref. 1 | Ex. 1 | Ex. 2 | Ex. 3 | Ex. 4 | Ex. 5 | Ex. 6 | Ex. 7 |
| --- | --- | --- | --- | --- | --- | --- | --- | --- |
| Inclination of Surface of Edging portion *1 | Absent | | | | | Inclined (+) | | |
| Inclination of Surface of Mark main portion *1 | Absent | | | | | Inclined (−) | | |
| Position of Equal height portion | — | In Middle region | | | Outside Middle region | In Middle region | | |
| Difference Δθ of Inclination angles [degree] | — | 0 | 5 | 10 | 0 | | 0 | |
| Small protruding portion | | Absent | | | | Truncated conical protrusion | Rib-shaped protrusion (parallel) | Rib-shaped protrusion (non-parallel) |
| Legibility | 100 | 110 | 110 | 107 | 107 | 115 | 130 | 135 |

*1 For the inclination, the direction in which the height from the reference surface increases from the inside to the outside in the tyre radial direction is defined as "+", and the opposite direction is defined as "−".

As shown in Table 1, it was confirmed that the tyres as the Examples showed excellent legibility of the marks.

The invention claimed is:

1. A tyre comprising a sidewall portion provided with a mark indicating portion having one or more marks,
   wherein the mark indicating portion comprises a reference surface provided on a surface of the sidewall portion and the one or more marks formed on the reference surface, and each mark is provided with a surrounding portion forming an outer edge of each mark and a mark main portion arranged inside the surrounding portion,
   a surface of the surrounding portion is inclined with respect to the reference surface in a direction in which a height thereof from the reference surface increases from one side to the other side in a tyre radial direction, and a surface of the mark main portion is inclined with respect to the reference surface in an opposite direction to the surface of the surrounding portion.

2. The tyre according to claim 1, wherein each mark has, in a middle region of a width thereof in the tyre radial direction, an equal height portion in which a height of the surface of the surrounding portion from the reference surface and a height of the surface of the mark main portion from the reference surface are equal to each other.

3. The tyre according to claim 2, wherein the middle region has a width of 20% of the width in the tyre radial direction of each mark.

4. The tyre according to claim 2, wherein the middle region has a center thereof on a position which is ½ of the width in the tyre radial direction of each mark.

5. The tyre according to claim 1, wherein a difference Δθ between an inclination angle θ1 of the surface of the surrounding portion with respect to the reference surface and an inclination angle θ2 of the surface of the mark main portion with respect to the reference surface is not more than 5 degrees.

6. The tyre according to claim 1, wherein in each mark, one of the surface of the surrounding portion and the surface of the mark main portion is provided with a plurality of small protruding portions, and wherein each of the small protruding portions is a truncated conical protrusion having a smaller diameter on a side of an upper end thereof.

7. The tyre according to claim 6, wherein each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

8. The tyre according to claim 1, wherein at least one of the surrounding portion and the mark main portion includes a portion in which the surface of the at least one of the surrounding portion and the mark main portion is lower than the reference surface.

9. The tyre according to claim 1, wherein the surrounding portion surrounds the entire outer periphery of the mark main portion, and
wherein a surface of the mark main portion is inclined with respect to the reference surface in an opposite direction to the entire surrounding surface of the surrounding portion.

10. The tyre according to claim 1, wherein the sidewall portion faces a direction orthogonal to a tyre radial direction, and
wherein the surface of the surrounding portion faces the direction orthogonal to the tyre radial direction.

11. A tyre comprising a sidewall portion provided with a mark indicating portion having one or more marks,
wherein the mark indicating portion comprises a reference surface provided on a surface of the sidewall portion and the one or more marks formed on the reference surface, and each mark is provided with an edging portion forming an outer edge of each mark and a mark main portion arranged inside the edging portion,
wherein a surface of the edging portion is inclined with respect to the reference surface in a direction in which a height thereof from the reference surface increases from one side to the other side in a tyre radial direction, and a surface of the mark main portion is inclined with respect to the reference surface in an opposite direction to the surface of the edging portion, and
wherein the edging portion extends along both circumferential sides of the mark main portion.

12. The tyre according to claim 11, wherein each mark has, in a middle region of a width thereof in the tyre radial direction, an equal height portion in which a height of the surface of the edging portion from the reference surface and a height of the surface of the mark main portion from the reference surface are equal to each other.

13. The tyre according to claim 12, wherein the middle region has a width of 20% of the width in the tyre radial direction of each mark.

14. The tyre according to claim 12, wherein the middle region has a center thereof on a position which is ½ of the width in the tyre radial direction of each mark.

15. The tyre according to claim 11, wherein a difference Δθ between an inclination angle θ1 of the surface of the edging portion with respect to the reference surface and an inclination angle θ2 of the surface of the mark main portion with respect to the reference surface is not more than 5 degrees.

16. The tyre according to claim 11, wherein in each mark, one of the surface of the edging portion and the surface of the mark main portion is provided with a plurality of small protruding portions, and wherein each of the small protruding portions is a truncated conical protrusion having a smaller diameter on a side of an upper end thereof.

17. The tyre according to claim 11, wherein each of the truncated conical protrusions has a maximum diameter in a range of from 50 to 1000 micro meters and a protruding height in a range of from 50 to 1000 micro meters, and a distance between centers of the truncated conical protrusions adjacent to each other is in a range of from 200 to 1000 micro meters.

18. The tyre according to claim 11, wherein the edging portion surrounds the entire outer periphery of the mark main portion, and
wherein a surface of the mark main portion is inclined with respect to the reference surface in an opposite direction to the entire surrounding surface of the edging portion.

19. The tyre according to claim 11, wherein the sidewall portion faces a direction orthogonal to a tyre radial direction, and
wherein the surface of the edging portion faces the direction orthogonal to the tyre radial direction.

* * * * *